(12) United States Patent
Polick

(10) Patent No.: US 6,540,517 B1
(45) Date of Patent: Apr. 1, 2003

(54) MULTI-BOOK

(75) Inventor: Peter Polick, New York, NY (US)

(73) Assignee: Innovative USA, Inc., Norwalk, CT (US)

( * ) Notice: Subject to any disclaimer, the term of this patent is extended or adjusted under 35 U.S.C. 154(b) by 0 days.

(21) Appl. No.: 09/950,476

(22) Filed: Sep. 10, 2001

(51) Int. Cl.[7] .............................................. G09B 19/08
(52) U.S. Cl. ........................ 434/156; 281/16; 434/430
(58) Field of Search .......................... 281/15.1, 16, 17; 434/156, 167, 171, 172, 365, 403, 428, 433

(56) References Cited

U.S. PATENT DOCUMENTS

| | | | | |
|---|---|---|---|---|
| 733,841 A | * | 7/1903 | Holm | 281/16 |
| 1,913,818 A | * | 6/1933 | Petrick | 281/16 |
| 2,005,717 A | * | 6/1935 | Coulston | 57/58.49 |
| 2,310,707 A | * | 2/1943 | Petrie | 281/17 |
| 3,758,136 A | * | 9/1973 | Guyer | 281/16 |
| 3,962,816 A | | 6/1976 | Sarid | |
| 4,219,958 A | | 9/1980 | Shulyak | |
| 4,323,244 A | | 4/1982 | Busing | |
| 4,735,418 A | | 4/1988 | Engel | |
| 4,865,574 A | | 9/1989 | Kobayashi | |
| 4,993,989 A | | 2/1991 | Gidwani | |
| 5,018,764 A | | 5/1991 | Beardell | |
| D320,411 S | * | 10/1991 | Wyant | 281/15.1 |
| D324,891 S | | 3/1992 | Vershaeve, Jr. et al. | |
| 5,246,253 A | * | 9/1993 | Mykrantz | 281/16 |
| 5,322,284 A | | 6/1994 | El-Agamawi | |
| 5,383,684 A | | 1/1995 | Smath | |
| 5,651,715 A | | 7/1997 | Shedelbower | |
| 5,725,196 A | * | 3/1998 | Scheel | 281/15.1 |
| 5,788,503 A | | 8/1998 | Shapiro | |
| 5,794,980 A | | 8/1998 | Bigler | |
| 5,803,743 A | | 9/1998 | Kaufman | |
| 5,882,763 A | | 3/1999 | Prerttunen et al. | |
| 5,895,219 A | | 4/1999 | Miller | |
| 5,928,753 A | | 7/1999 | Prettunen et al. | |
| 5,962,801 A | | 10/1999 | Bowman et al. | |
| 6,050,311 A | | 4/2000 | Obenski | |
| 6,079,748 A | | 6/2000 | Kaufman | |

FOREIGN PATENT DOCUMENTS

GB 2248582 A 4/1992

* cited by examiner

Primary Examiner—Kien T. Nguyen
(74) Attorney, Agent, or Firm—Hedman & Costigan, P.C.

(57) ABSTRACT

The invention is a novel book design and structure especially adapted for children, having at least two sections, each of which can be opened independently of others and more than one section can be opened at once, and which sections are connected by hinges along different edges of the pages, and each section may be read at a different orientation to the previous section.

16 Claims, 3 Drawing Sheets

MULTI-BOOK

FIELD OF THE INVENTION

The present invention relates to a multiple sectioned book especially useful as an interactive book for children which has a plurality of independently openable sections, that may be related in content or storyline.

BACKGROUND OF THE INVENTION

Books, and especially picture books, have always been useful and very instrumental for both teaching and entertaining children. Books with varying parts that combine to form a whole story or picture are well known in the literary art. As an example, a hinged children's book is described in U.S. Pat. No. 4,865,574 to Kobayashi. The Kobayashi book has a succession of partial scenes on hingedly connected fold-out panels, which, when deployed, reveal a completed picture. As another example, a book with partial page portions that can be independently turned is described in U.S. Pat. No. 5,788,503 to Shapiro. The partial pages of the Shapiro book depict incomplete parts of words and are meant to be combined to create whole words. However, neither book describes or has multiple bindings employed in such a way that any particular section can be independently opened to enable the reader to view and read easily and conveniently the entire contents within each section as selected, which may or may not be parts of a whole.

Other exemplary prior art disclosures are:

U.S. Pat. No. 3,962,816 to Sarid describes a foldable structure that consists of a rectangular continuous strip having at least twelve squares flexibly hinged together and arranged in parallel rows and columns relative to the top and bottom edges of the strip. Each square is bisected by a diagonal and the two triangular halves of each of said squares is especially adapted for displacement with relation to each other.

U.S. Pat. No. 4,323,244 to Busing describes a solid geometrical puzzle having a plurality of components each of which is hinged along two edges to neighboring components. The assembly is such that it may be folded along various hinge lines to form many regular and irregular geometric shapes.

U.S. Pat. No. 4,993,989 to Gidwani, describes a folding device for use as a toy, puzzle, and/or game, having a plurality of like polygonal components, each component having a pair of symmetrically arranged, mirror segments, which are interconnected along a common hinge. The segments have especially related sides and hinges to form unique components and interconnecting polygonal components.

U.S. Pat. No. 5,794,980 to Bigler comprises a folding apparatus and processes for educating and entertaining persons. The apparatus comprises one or more sheets with cuts, slits, or slots through which cards or strips are woven to give a foldable device. The invention includes an apparatus to give special effects by folding and processes for the manufacture and use of such apparatus.

U.S. Pat. No. 5,895,219 to Miller describes an apparatus and method for teaching reading skills using a storyboard having sentences imprinted thereon and having at least one missing word. There are words stored at a remote location. The child is then taught to select a word from the remote location and by various means can verify and confirm the meaning of the word and its relationship and suitability for use in the missing location.

However, none of the prior art references teach or suggest a book having multiple connected sections, each section having its own binding, thereby enabling a particular section to be independently opened to view and to read the separate sections.

SUMMARY OF THE INVENTION

Figure 1:
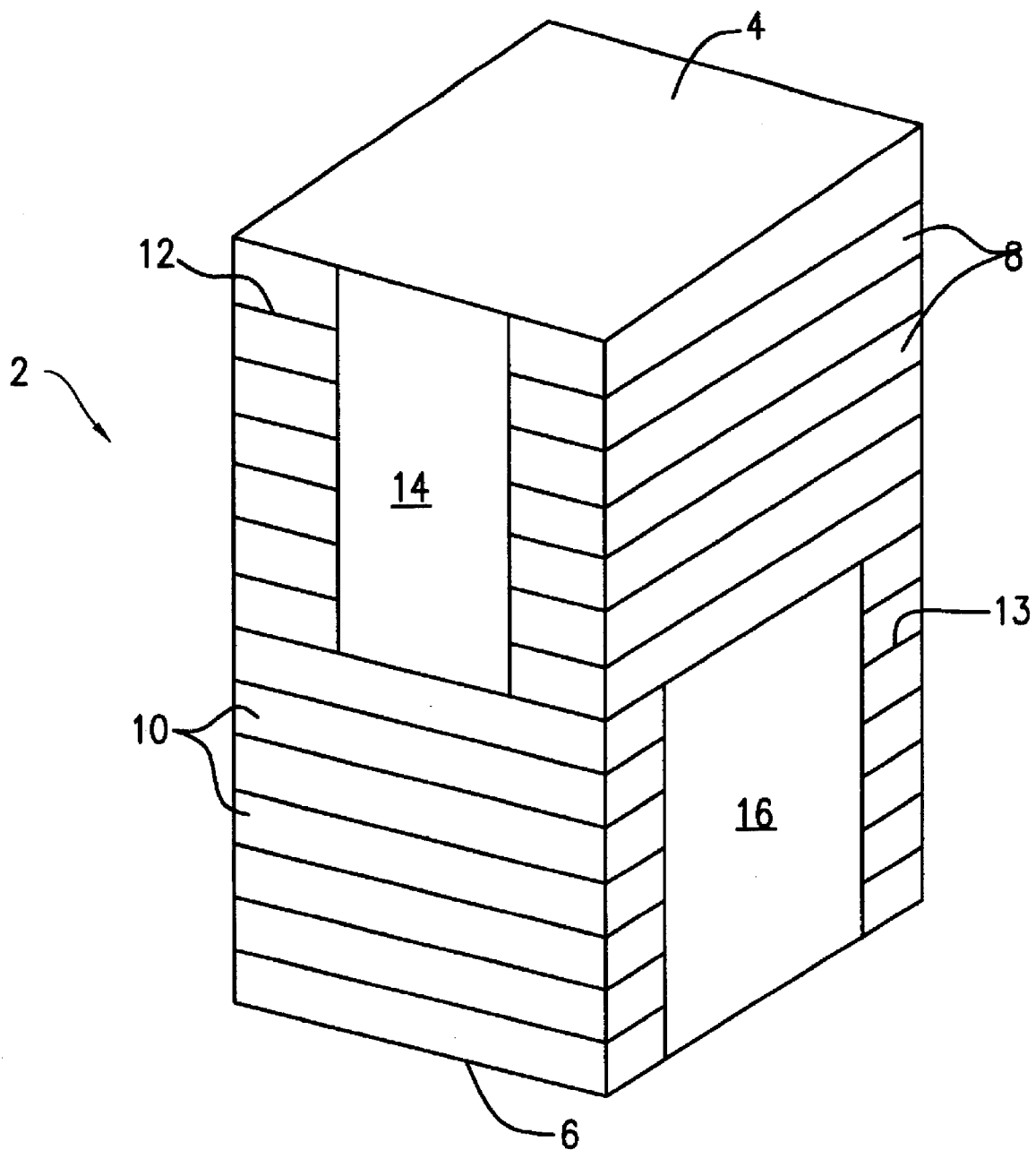
FIG. 1 shows a side view of a book of the present invention in the closed position.

The invention comprises a novel book design structured with at least two sections, each section of which can be opened singly and in combination and independently of the other sections. More than one of the sections can be opened at once as may be required or needed. The combination of sections is connected into a single book.

A plurality of the sections are hingedly connected in order that they can be opened in various directions. Each hinged section is connected to the other sections along at least one edge. The various edges can be described if desired as a first edge, a second edge, and so forth depending upon the number of edges of the book page, to identify location and structure.

Accordingly, it is an object of the present invention to provide a book for children that creates a high level of interest by incorporating multiple sections that contain a variety of reading material related to various subjects.

It is also an object of the present invention to provide a multi-sectional book for children wherein each section can be opened and read independently of the other sections.

It is further object to provide a book that would capture and hold the interest of young readers by providing to them varying aspects of a single activity or storyline, or varying endings to a single story.

It is another object to provide a book that teaches alternate related aspects of a unifying concept that can be read sequentially as the reader feels mastery over the previous section.

It is also an object of the present invention to provide an outline and structure for children that creates a high level of interest by incorporating multiple sections that contain a variety of reading material of variable subject matter.

It is also an object of the present invention to provide a multi-sectional book for children wherein each section can be opened and read independently of the others.

To summarize, the present invention comprises a book that contains multiple sections bound together on different edges of the pages which can be separately opened and read.

DETAILED DESCRIPTION OF THE INVENTION

The present invention comprises a novel book design that contains multiple sections each of which can be separately opened and read. It is believed that especially for young children, a related series of stories could be provided, for instance, stories about different animals in each book. Alternately, the book may focus on stories about how things work, with the sections providing information on how cars work, how electricity works, and so forth, including the many and varied subjects of our current society. Alternately, the sections may be organized in such a way that they can be read in a so-called "round robin" fashion, with the last section referring back to and relating to the first section so that the stories form a never-ending and continuous loop, which would be enjoyable and of special interest to young readers. The book of the present invention also provides a three-dimensional quality due to its sectional format that young readers generally find entertaining, and lends itself to additional formatting options.

In another related embodiment, each section may contain a different aspect of a unifying and related subject. Each book section can be opened and studied independently, but when used in combination, they will teach a unified idea or basic concept. When the student has completed a first section of the multi-book, the student may easily move to the next section of the multi-book that may be of a more difficult level, or he may review particular sections of the just completed multi-book section, if desired and/or of special interest. Thus, there are a variety of useful and interesting choices.

The multi-book may also provide a pleasing juxtaposition of related concepts, or may contain concepts that reinforce each other or form interesting new combinations when considered together. Also each section may be used to bring forth an advancement of some idea or even a story, over the previous section, especially if the sections are envisioned and arranged in some specific order, which is another possible and useful embodiment. Thus, there is a sense of achievement when the book is used as a learning tool by the reader.

The sections can for example contain random but related information such as one is a story about pigs, another about cows and milking, another about chickens and feathers and eggs. Or the general subject can be about professions, where each section is related to discussion about people in various different professions. Also, the subject can be different crafts, thus there can be different shapes and their uses for practical as well as playful and entertaining purposes. Also, the book can relate a continuous story with each section constituting a different chapter.

Further, different explanations of how things work may be related to ongoing life experience such as how do ships, cars, other machines and everyday devices function. For a further example, how does electricity make the computer, the TV, lights, microwave oven, heaters and the like function. Another example is a book on animals, each about a different large animal, such as the giraffe, the elephant, the zebra, the lion and many others.

Therefore, it would be desirable to provide such a book having a multiplicity of parts or sections, each containing related material, all of which will attract and hold the interest of a child or other reader.

It would also be desirable to provide a book which has a series of related concepts or stories that can be read either sequentially or in any order as desired by the reader.

It would also be desirable to provide a book that will capture the interest of a child for a prolonged period of time, without having to take separate books or other material for instance, when traveling or moving on to other interests and projects.

Accordingly, the present invention comprises a book consisting of at least two adjacent page sections wherein the first section comprises at least two pages bound along a common first edge by a first binding means and wherein said second section comprises at least two pages bound along a common second edge by a second binding means.

Figure 2:
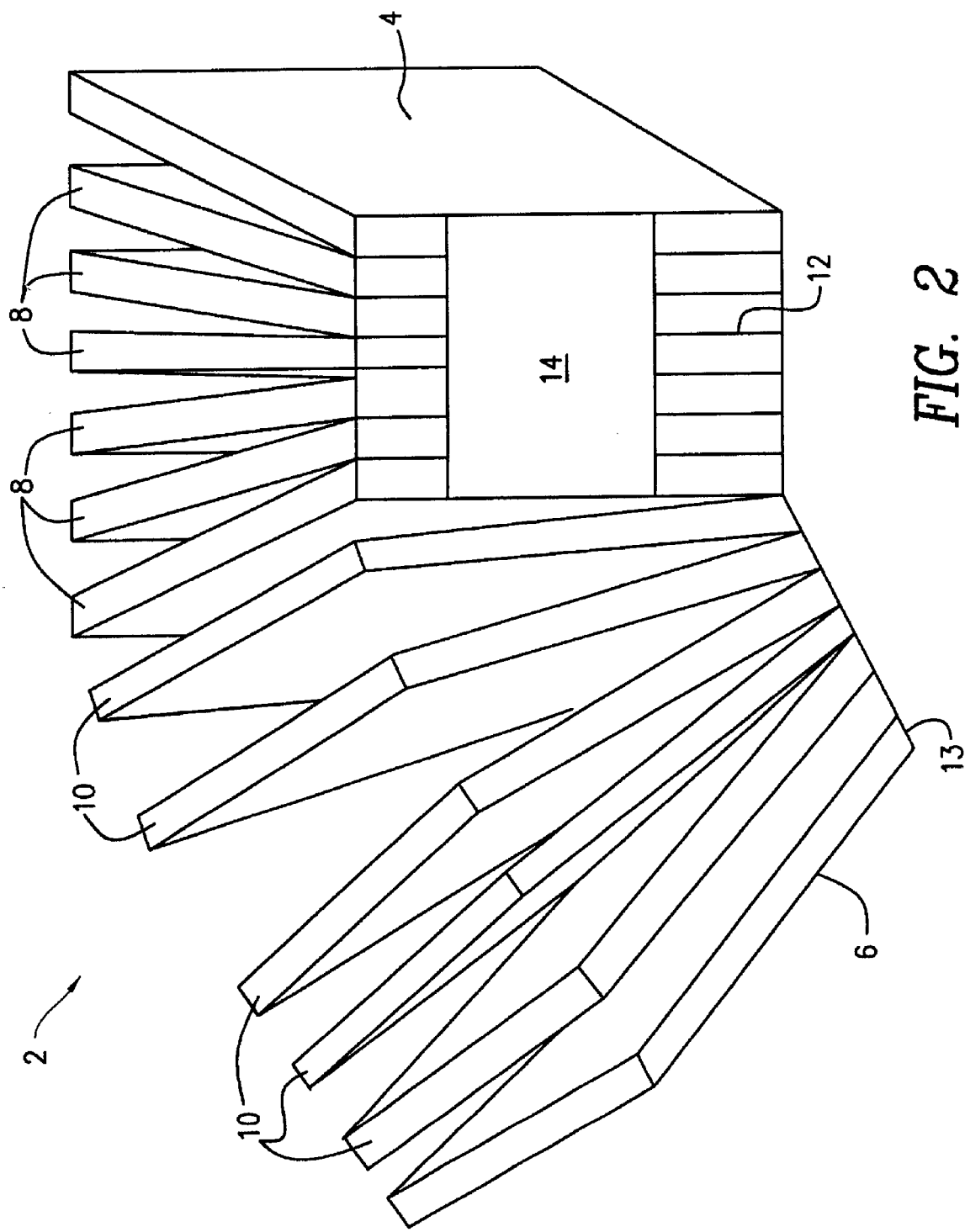
FIG. 2 shows a side view of a book of the present invention in a partially opened position.

Illustratively, a book designed in accordance with the present invention is shown in FIGS. 1 and 2. Referring to FIG. 1, there is shown a book 2 of the present invention. The book 2 comprises a front cover 4, a back cover 6, a first set of pages 8 and a second set of pages 10.

The front cover 4 and back cover 6 may be constructed of any material known to those skilled in the art that provides sufficient rigidity and printability. These materials may include but are not limited to paper, cardboard, textiles, foam rubbers and plastics. Preferred is cardboard ranging from about $1/32$ to about $3/32$ of an inch in thickness. Especially preferred is cardboard that is about $1/16$ of an inch thick. The front cover 4 and back cover 6 may be constructed of the same material and be of the same thickness or they may be constructed of different materials and be of different thicknesses.

Likewise, the pages 8 and 10 may be constructed of any material known to those skilled in the art that provides sufficient rigidity and printability. These materials may include but are not limited to paper, cardboard, textiles, foam and plastics. Preferred are paper or cardboard. The pages may be of different or the same thickness as each other and/or the covers.

The first set of pages 8 are bound together with front cover 4 along the same common first edge 12, by binding 14. Binding 14 may include any of the well-known conventional binding means, i.e. gluing, stitching with a string, a saddle wire or with a spiral wire or other material wound through a multitude of holes punched through the pages. These and other types of bindings are well known to those skilled in the art. FIG. 1 shows a binding that comprises a strip of material 14 to which the cover 4 and the pages 8 are attached by adhesive in the manner of a gate-fold. The binding 14 in FIG. 1 does not extend the width of the common edge, but can if desired. The only requirement is that the binding securely fasten the page set together.

Similarly, the second set of pages 10 and the back cover 6 are attached along a common second edge 13 that is adjacent to the first by binding 16. The second binding 16 may be the same or different type of binding as the first binding 14, depending upon the specific desires of the book designer. Note also that the last page of the first section of pages also functions as the first page of the second set of pages.

Of course, the second set of pages could have been bound along a common edge opposite the first common edge, or along the other adjacent edge. Likewise, the book may include any number of sections as long as the pages of the adjacent sections are bound along different common edges. Similarly, the book can be of any polygonal shape such as a triangle, square, rectangle, pentagon, hexagon etc. In a preferred embodiment the book is of a substantially square shape wherein each section of pages is bound along a different one of the four common edges.

It is further contemplated that the number of pages in a section is completely variable and each section can have the same or a different number of pages.

Referring to FIG. 2 there is shown a book of the present invention similar to that shown in FIG. 1 except that the number of pages in each section is changed. This FIG. 2 demonstrates how each section of the pages will open in a different direction.

Figure 3:
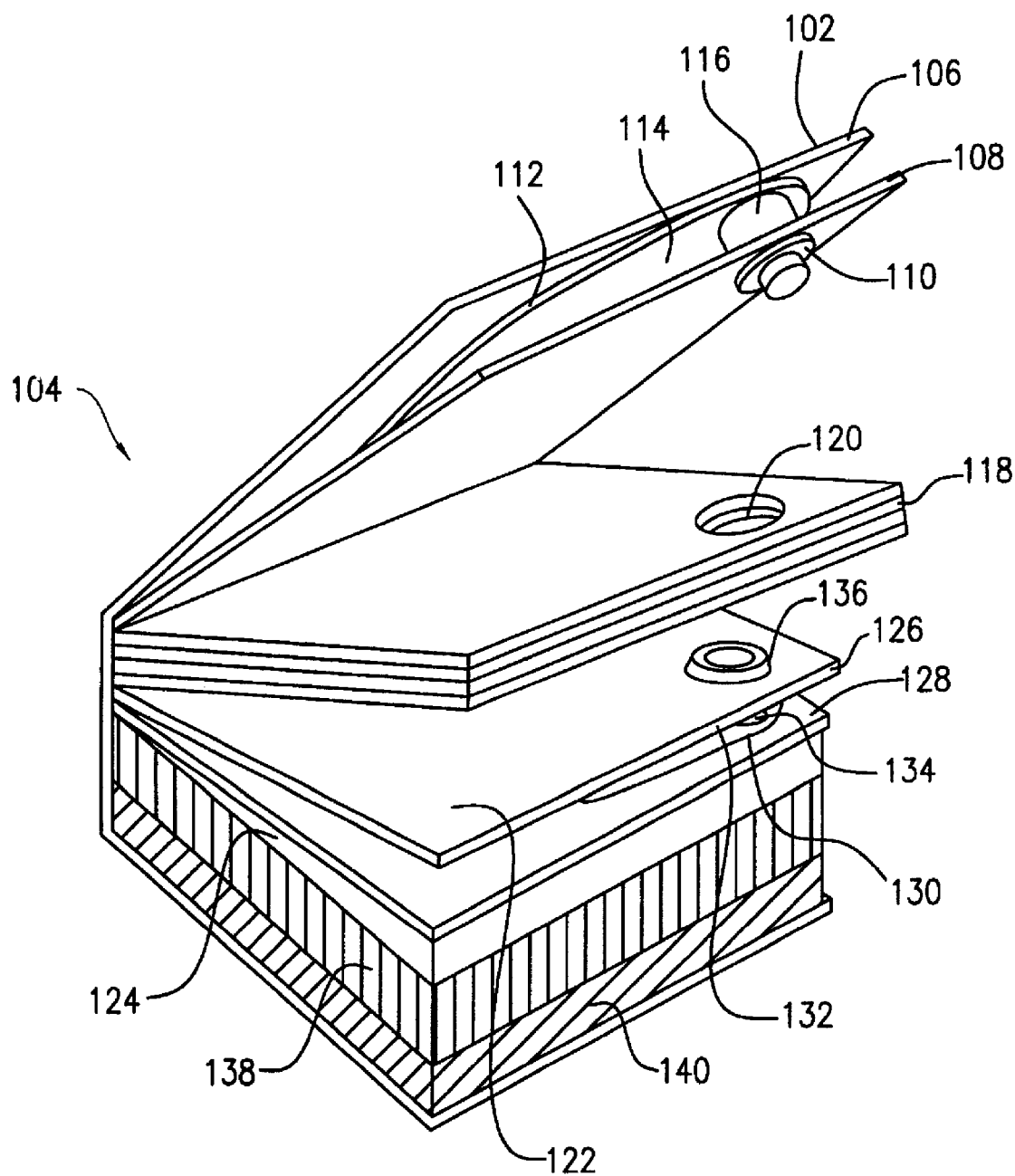
FIG. 3 shows a side view of another embodiment of a book of the present invention in a partially opened position.

Referring to FIG. 3 there is shown another embodiment of a book of the present invention wherein the pages of each section are attached together to prevent opening while the reader is viewing a different section. Specifically, in the embodiment of FIG. 3 the top cover 102 of book 104 is comprised of front cover outer layer 106 and front cover inner layer 108. Front cover inner layer 108 is provided with a hole 110. Sandwiched between front cover outer layer 106 and front cover inner layer 108 is a vacuum form male snap means 112. Vacuum form male snap means 112 is comprised of a flat section 114 and a male snap means 116. The vacuum form male snap means 112 is positioned such that the male snap means 116 extends through hole 110 of front cover inner layer 108. With the vacuum form male snap means properly positioned, the front cover outer layer 106 and front cover inner layer are then attached, such as by gluing or other means known to those skilled in the art. Each of the pages 118 of the first section of book 104 is provided with a hole 120 similar to hole 110 and in the same position on the page 118 as hole 110 is on the front cover 102, such that male snap means 116 can extend through all of pages 118.

The last page 122 of the first section of pages of book 104, which is also the first page of the second set 124 of pages of book 104, is also of a layered construction. Specifically, page 122 comprises a back cover inner layer 126 and a back cover outer layer 128. Back cover inner layer 126 has a hole 136 aligned with holes 120 and back cover outer layer 128 has a hole (not shown) which is in the same or preferably a different position than hole 136, and is aligned with holes (not shown) on the pages which comprise the second set 124 of pages of book 104. Sandwiched between the back cover inner layer 126 and back cover outer layer 128 comprises a vacuum form female/male snap means 130. The vacuum form female/male snap means 130 is comprised of flat sheet 132, female snap means 134 and a male snap means (not shown). The vacuum form female snap means 134 is positioned such that the female snap means 134 is aligned with hole 136 of back cover inner layer 126 and is suitable for receiving male snap means 116 to create a snap closure. The male snap means portion of female/male snap means 130 extends in the opposite direction of female snap means 134 and is positioned to align with hole (not shown) in back cover outer layer 128. With the vacuum form female/male snap means 126 properly positioned, the back cover inner layer 126 and back cover outer layer 128 are then attached, such as by gluing or other means known to those skilled in the art.

This construction is repeated for each of the sections 138 and 140 of book 104. In this manner, while the reader enjoys one section of the book, the remaining sections of the book will remain closed. The snap means employed with book 104 may be constructed of any rigid material such as but not limited to plastic, metal or velcro. Of course other attachment means such as releasing adhesives can be employed as will be appreciated by those skilled in the art. The provision of the vacuum form snap means has the advantage of improved child safety whereby if the snap were somehow to become detached from the book, the snap in a vacuum form snap means with the flat sheet cannot be swallowed by the child. Of course, in the case of books for older readers where choking is not an immediate concern, other snap type means known to those skilled in the art can be readily employed. Additionally, although the female/male snap means 130 was described in relation to FIG. 3 as a one piece construction, it may of course be comprised of two pieces, one piece having the female receiving snap portion and the other piece having the male protruding snap portion.

In preferred embodiments, the holes for each set of pages are in the upper or lower right hand corner of the page as the page is opened. The tightness of the snap may be varied by the book designer, but should be at least sufficient to bear the weight of the book pages, and loose enough so that a young reader can easily open and close the snap.

Many variations of the present invention will suggest themselves to those skilled in the art in light of the above-detailed description. All such obvious modifications are within the full intended scope of the appended claims.

All of the above-mentioned patents are hereby incorporated by reference.

What is claimed is:

1. A book comprising:
   (a) a front cover
   (b) a back cover
   (c) a first set of pages bound by a first binding means along a common edge to said front cover;
   (d) at least one additional set of pages bound by a second binding means along a common edge to a bottom page of said first set of pages;
   (e) an end set of pages bound by a third binding means along a common edge to a bottom page of said additional set of pages and said back cover
   wherein said bound page edges of the first and end sets of pages are a different bound page edge than the bound page edge of said additional set of pages.

2. A book as defined in claim 1 having a shape selected from the group consisting of a triangle, a square, a rectangle, a pentagon and a hexagon.

3. A book as defined in claim 2 wherein said book is in the shape of a triangle.

4. A book as defined in claim 2 wherein said book is in the shape of a square or a rectangle.

5. A book as defined in claim 4 wherein said book comprises four sets of pages, each said set bound along a different common edge by a separate binding means.

6. A book as defined in claim 5 wherein each adjacent set of pages is bound along a common edge adjacent to said adjacent set of pages.

7. A book as defined in claim 1 wherein each of said set of pages comprises from 2 to about 20 pages.

8. A book as defined in claim 1 wherein each of said set of pages comprises related subject matter.

9. A book as defined in claim 1 wherein each of said set of pages comprises unrelated subject matter.

10. A book as defined in claim 1 wherein each said binding means independently is the same or different and is comprised of gluing, stitching or a combination thereof.

11. A book as defined in claim 1 wherein the front cover, the back cover and pages are comprised of foam.

12. A book as defined in claim 1 wherein the front cover, back cover and pages are comprised of cardboard.

13. A book as defined in claim 1 wherein the front cover, back cover and pages are comprised of plastic.

14. A book as defined in claim 1 wherein each said set of pages is provided with a means for attaching said page sets.

15. A book as defined in claim 14 wherein said means for attachment comprises a protruding attachment member that extends from the first page or front cover of the page set through aligned holes in the interior pages of the page set and snappingly engages with a female receiving member attached to the last page or back cover of the page set.

16. A book as defined in claim 1 wherein the first page or front cover of the page set comprises a first outside layer, a first inside layer and a male protruding attachment member sandwiched between said outside layer and said inside layer and comprising a flat sheet of plastic having a male snap attachment protrusion sandwich vacuum formed therein which extends through a hole provided on said first inside layer and wherein said last page or back cover of said page set comprises a second outside layer and a second inside layer and a female snap receiving member sandwiched between said second outside layer and said second inside layer and comprising a flat sheet of plastic having a female snap attachment receiver vacuum formed therein and aligned with a hole provided on said inside layer and adapted to snappingly receive said male snap attachment protrusion.

* * * * *